United States Patent
Ahlbom et al.

(10) Patent No.: US 6,341,667 B1
(45) Date of Patent: Jan. 29, 2002

(54) ARRANGEMENT IN A CIRCULATION LUBRICATION SYSTEM

(75) Inventors: Kari Ahlbom; Ari Airaksinen, both of Muurame; Kari Antila, Korpilahti; Jari Rinkinen, Tampere; Arto Alfthan, Tarttila, all of (FI)

(73) Assignee: Safematic Oy, Muurame (FI)

( * ) Notice: Subject to any disclaimer, the term of this patent is extended or adjusted under 35 U.S.C. 154(b) by 0 days.

(21) Appl. No.: 09/367,590
(22) PCT Filed: Feb. 11, 1998
(86) PCT No.: PCT/FI98/00122
   § 371 Date: Oct. 29, 1999
   § 102(e) Date: Oct. 29, 1999
(87) PCT Pub. No.: WO98/37357
   PCT Pub. Date: Aug. 27, 1998

(30) Foreign Application Priority Data

Feb. 18, 1997 (FI) .................................................. 970685

(51) Int. Cl.⁷ ............................................. F01M 11/08
(52) U.S. Cl. ..................... 184/6.23; 184/6.24; 210/324; 210/520; 210/539; 210/540; 210/DIG. 5; 96/214; 96/216; 96/219
(58) Field of Search ................................ 184/6.23, 6.24; 137/173; 210/360.1, 380.1, 381, 416.1, 416.5, 324, 331, 520, 539, 540, DIG. 5; 95/254, 261; 96/214, 216, 219

(56) References Cited

U.S. PATENT DOCUMENTS

| | | | | |
|---|---|---|---|---|
| 2,010,430 A | * | 8/1935 | Howard et al. .............. | 184/6.24 |
| 2,181,688 A | * | 11/1939 | Walker ......................... | 208/187 |
| 2,216,977 A | * | 10/1940 | Mahone ....................... | 208/187 |
| 2,262,527 A | * | 11/1941 | Fairlie et al. ................ | 184/6.24 |
| 2,297,297 A | * | 9/1942 | Walker ......................... | 95/253 |
| 2,304,618 A | * | 12/1942 | Williams ..................... | 184/6.24 |
| 2,335,420 A | * | 11/1943 | Jones .......................... | 184/6.24 |
| 2,354,856 A | * | 8/1944 | Erwin .......................... | 208/187 |
| 2,384,222 A | * | 9/1945 | Walker ......................... | 95/253 |
| 2,528,032 A | * | 10/1950 | Chandler et al. ............ | 95/253 |
| 2,944,966 A | * | 7/1960 | Eickmeyer ................... | 208/187 |
| 3,005,518 A | | 10/1961 | Jassniker ..................... | 184/6 |
| 3,043,072 A | * | 7/1962 | Walker et al. ................ | 95/253 |
| 3,452,518 A | * | 7/1969 | Skaug et al. ................. | 96/216 |
| 3,771,287 A | | 11/1973 | Sunderland .................. | 55/182 |
| 3,789,579 A | * | 2/1974 | El-Hindi ...................... | 55/50 |
| 3,879,286 A | * | 4/1975 | Berriman ..................... | 210/331 |
| 4,011,158 A | * | 3/1977 | Cook ........................... | 210/DIG. 5 |
| 4,089,662 A | * | 5/1978 | Williams ..................... | 55/166 |
| 4,834,783 A | * | 5/1989 | El-Saie ........................ | 96/219 |
| 4,936,986 A | * | 6/1990 | Tarves, Jr. ................... | 210/331 |
| 5,037,562 A | * | 8/1991 | Tarves, Jr. ................... | 95/261 |
| 5,039,425 A | * | 8/1991 | Caris et al. .................. | 95/253 |
| 5,413,462 A | * | 5/1995 | Alberni ........................ | 184/6.23 |
| 5,464,536 A | * | 11/1995 | Rogers ........................ | 210/380.1 |
| 5,565,094 A | * | 10/1996 | Zoch et al. .................. | 184/6.11 |
| 5,577,575 A | * | 11/1996 | Mielo .......................... | 184/6.24 |
| 5,582,271 A | * | 12/1996 | Mielo .......................... | 184/6.23 |
| 5,599,460 A | * | 2/1997 | Van Schoiack et al. ..... | 184/6.24 |
| 5,656,173 A | * | 8/1997 | Jordan et al. ................ | 210/DIG. 5 |
| 5,750,040 A | * | 5/1998 | Hays ............................ | 95/261 |
| 5,997,739 A | * | 12/1999 | Clausen et al. .............. | 210/DIG. 5 |

FOREIGN PATENT DOCUMENTS

| | | |
|---|---|---|
| EP | 794 380 | 9/1997 |
| FI | 95622 | 11/1995 |
| FR | 480.691 | 9/1916 |
| WO | 94/16263 | 7/1994 |

* cited by examiner

Primary Examiner—David A. Bucci
Assistant Examiner—Chong H. Kim
(74) Attorney, Agent, or Firm—Pillsbury Winthrop LLP

(57) ABSTRACT

An arrangement in a circulation lubrication system includes a lubricating oil tank, pressure pipe lines for supplying oil to parts that are to be lubricated, return pipe lines for returning the oil from the parts that are to be lubricated to the oil tank, and a mechanism for pumping oil into the pressure pipe lines and maintaining a desired state of lubrication. The lubricating oil tank has a rotationally symmetric structure; and a return duct, positioned at the center axis of the rotationally symmetric structure, is configured to extend below the surface of the oil in the lubricating oil tank. A return flow through the return duct passes through a dividing element to a mechanism configured to separate impurities from the oil.

4 Claims, 2 Drawing Sheets

ARRANGEMENT IN A CIRCULATION LUBRICATION SYSTEM

This application is the national phase of international application PCT/FI98/00122 file Feb. 11, 1998 which designated the U.S.

BACKGROUND OF THE INVENTION

1. Field of the Invention

The invention relates to an arrangement in a circulation lubrication system comprising a lubricating oil tank; pressure pipe lines for supplying oil to parts to be lubricated; return pipe lines for returning the oil from the parts to be lubricated to the oil tank; and means for pumping oil into the pressure pipe lines and maintaining a desired state of lubrication.

2. Description of the Related Art

Circulation lubrication systems are today used widely to lubricate various machines especially when the lubricant is used for cooling the parts to be lubricated. An example of the use of circulation lubrication is the lubrication of the bearings of the drying cylinders in paper machines or the lubrication of gas turbines. In both cases the bearings are subject to a thermal load from the outside.

Circulation lubrication is also used when the part to be lubricated creates considerable dissipation power. One example of such applications is the lubrication of gear boxes.

Still another use of circulation lubrication is in cases where the lubricant may get dirty in the part to be lubricated, and it should be possible to reuse the lubricant after cleaning.

A circulation lubrication system usually comprises a pump operated by an electric motor. The pump brings the oil into motion. The output of the pump is usually selected so that it exceeds the required flow rate by 10 to 20%, so that a sufficient operating margin is left for the control of bypass pressure. Oil is arranged to pass through replaceable filters. The filters are often arranged in two groups so that one group can be separated by means of valves and the filters can be changed without having to stop the entire assembly. An electric or steam-operated heater is often used for further heating the oil. The oil is cooled by a heat exchanger having water or air cooling means. The cooling power is adjusted by a temperature regulator provided for supply oil. The set value of the temperature regulator is often typically about 55° C. Pressure control is often effected by a bypass valve back to the oil tank. Depending on the system, the set values of the pressure controller typically vary between 5 and 20 bar.

Oil is supplied to parts needing lubrication, such as different parts in paper machine, by means of pressure trunk pipes usually made of rustproof material. The oil flows in the pipes as a laminar flow, and so the pressure drop is small. From the trunk pipes the oil is distributed to a plurality of flow metering boards wherefrom it is divided into rising pipes to be supplied to a number of parts to be lubricated. From these parts the oil is passed through return pipes by utilizing gravitation into collector pipes on the return side. The oil is passed under the influence of gravitation through the collector pipes into the tank of the circulation lubrication assembly. The pipes on the return side are never full of oil. The inclination of the pipes is about 2 to 3% towards the tank of the assembly. Before the tank the return oil is passed through a coarse-mesh filter. The oil returned into the tank is then again sucked into circulation by the pump. The dimensions of the tank are usually such that the oil stays in the tank for a certain period of time depending on the viscosity of the oil.

In the system the lubricating oil tank has several functions for conditioning the oil before recirculation. One function of the tank is to allow air bubbles contained in the oil to rise to the surface. Air bubbles may increase the liability of the pump to cavitation, and they may deteriorate the lubricating film formed on the part needing lubrication. Another function is to allow large dirt particles with density considerably higher than that of oil to deposit on the bottom of the tank. To some extent water drops contained in the oil will also fall down in the tank. The density of water is so close to that of oil that the falling speed is slow. The tank condenses moist air flowing in the return pipes on the tank walls and drains the water along the walls, thus collecting it on the bottom of the tank. The tank also cools the oil through the walls. Furthermore, the tank forms a space into which the pipe lines are emptied at system shutdowns, and the tank serves as an oil storage in case of a pipe leakage, so that the machine to be lubricated can be shut down controllably. Still another function of the pump is to make sure that there is always oil in the pump suction means in order that air would not be sucked along. The moisture and suitable temperature also enable bacteria to grow in the tank.

The tank also comprises thermostat-controlled oil heaters, which may be either electric or steam-operated heaters. The heaters are used to heat the great amount of oil contained in the oil tank within 4 to 8 hours typically to about 55° C. before the system is started as the screw pumps used are not able to pump cold oil of high viscosity at full power without the risk of cavitation.

Present circulation lubrication oil tanks have had similar basic solutions for decades. A tank is basically a rectangle, the capacity of which may typically vary from a few hundred liters up to 30 cubic meters. The size required depends on the operating principle of the tanks, according to which principle, to keep in good condition, the oil must be allowed to rest in the tank about 30 minutes, so that impurities contained in the oil could be separated before the oil is recirculated. In addition to storing the oil, the tank must also cool the oil and be able to separate air, water and other impurities from the oil as stated above.

Because of their big size, the previously used tanks are often difficult to place in connection with machinery needing lubrication. Furthermore, a great amount of oil involves great investments, and especially today, it also involves a fire load, brought about by a great capacity, with other environmental risks. In practice, measurements have also proved that despite the big size of the tank only a small portion of the capacity of the tank is efficiently involved in the oil circulation. When the function of the flow fields is measured by calculating courses of particles without a mass, the same phenomenon is observed also numerically. In a typical conventional tank provided with partition walls the operating efficiency is only 35 to 44%, which indicates the actual flow-through time in proportion to the theoretical flow-through time. In practice, for example a tank of 8 cubic meters, in which 350 liters of oil flow per minute, has the theoretical flow-through time of 22 minutes 52 seconds, in which time the amount of oil would go once through the system. In reality however, warm oil entering the tank tends to form internal flow channels inside the tank due to differences in the viscosity of oil. These channels make the contents of the tank form walls in a stationary oil mass and a main flow-through channel formed in the oil mass. In reality, the theoretical flow-through time of 22 minutes 52 seconds is now in a range of 8 to 10 minutes, which is definitely too short. In addition to channeling, the flow field of previously known tanks is also subject to heavy whirl forming, which makes the separation of dirt particles difficult. Channeling results from high flow rates in the tank.

BRIEF SUMMARY OF THE INVENTION

The object of the invention is to provide an arrangement, by means of which the drawbacks of the prior art can be eliminated, i.e. to provide a flow field that is as even as possible, which would result in a substantially more efficient use of oil capacity and a more efficient separation of dirt particles as compared with previous solutions. This is achieved by means of an arrangement according to the invention, which is characterized in that the lubricating oil tank has a rotationally symmetric structure, and that the return duct is arranged at the centre axis of the rotationally symmetric structure and further arranged to reach below the surface of the oil contained in the lubricating oil tank, and that the flow through the return duct is arranged to be passed through a dividing element to means for separating impurities.

The primary advantage of the invention is that it allows a very efficient use of the oil capacity and very efficient separation of impurities. Another advantage of the invention is that it is simple so that its introduction and use are economical.

BRIEF DESCRIPTION OF THE SEVERAL VIEWS OF THE DRAWINGS

The following invention will be described more closely by means of embodiments shown in the attached drawings, wherein.

DETAILED DESCRIPTION OF THE INVENTION

Figure 1:
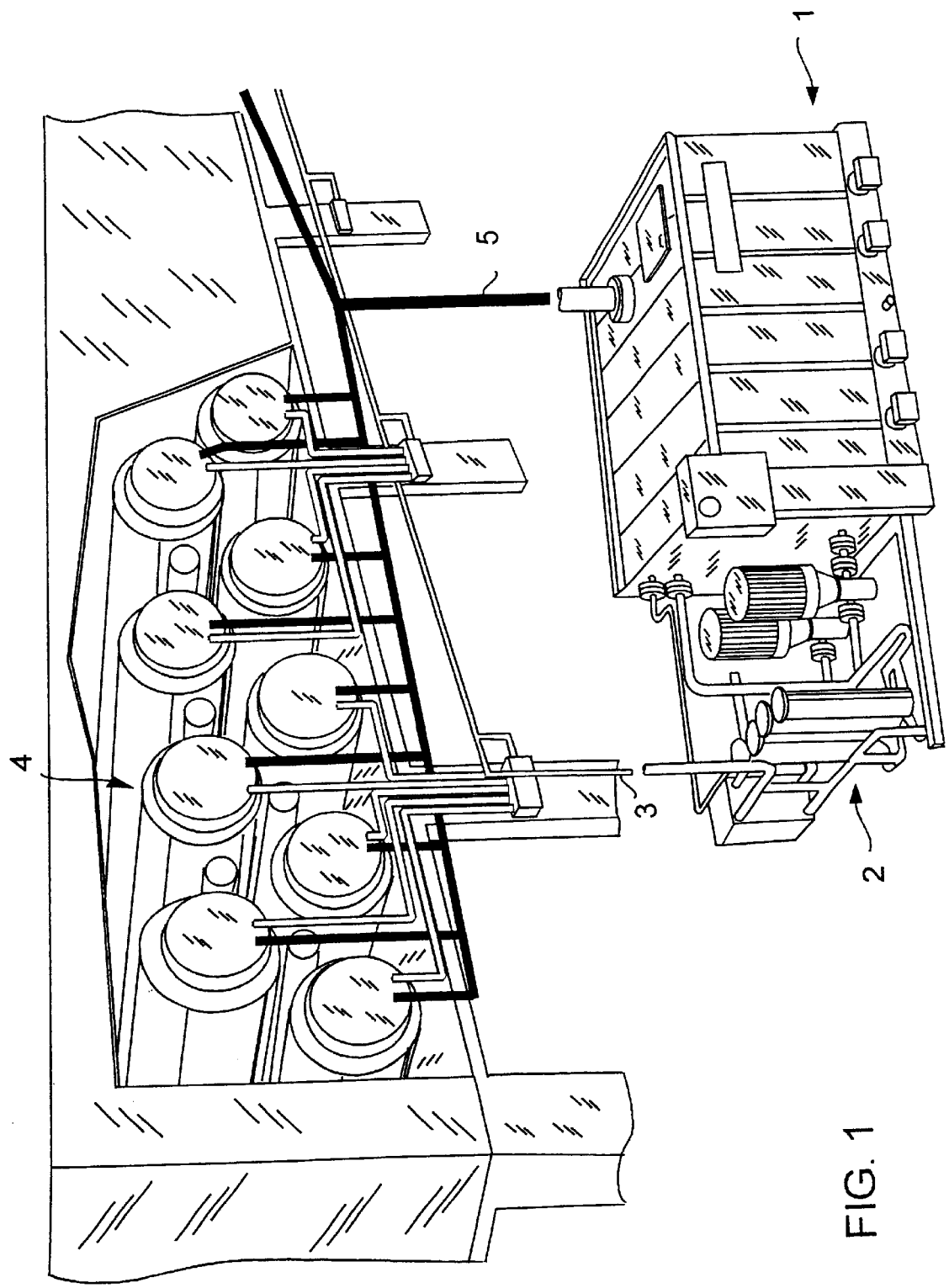
FIG. 1 is a general view of a circulation lubrication system for a paper machine.

FIG. 1 is a general view of a circulation lubrication system for a paper machine. The reference numeral 1 indicates generally an oil tank and the reference numeral 2 indicates generally an assembly comprising pumps, filters and other similar devices. The reference numeral 3 shows pressure pipe lines for supplying oil used as a lubricant to parts 4 to be lubricated, in this special case to drying cylinders in the paper machine. Further in FIG. 1, the reference numeral 5 indicates return pipe lines for returning the oil from the parts to be lubricated to the oil tank 1. The structure and operation of the system shown in FIG. 1 are obvious to one skilled in the art, so these matters will not be described more closely herein.

Figure 2:
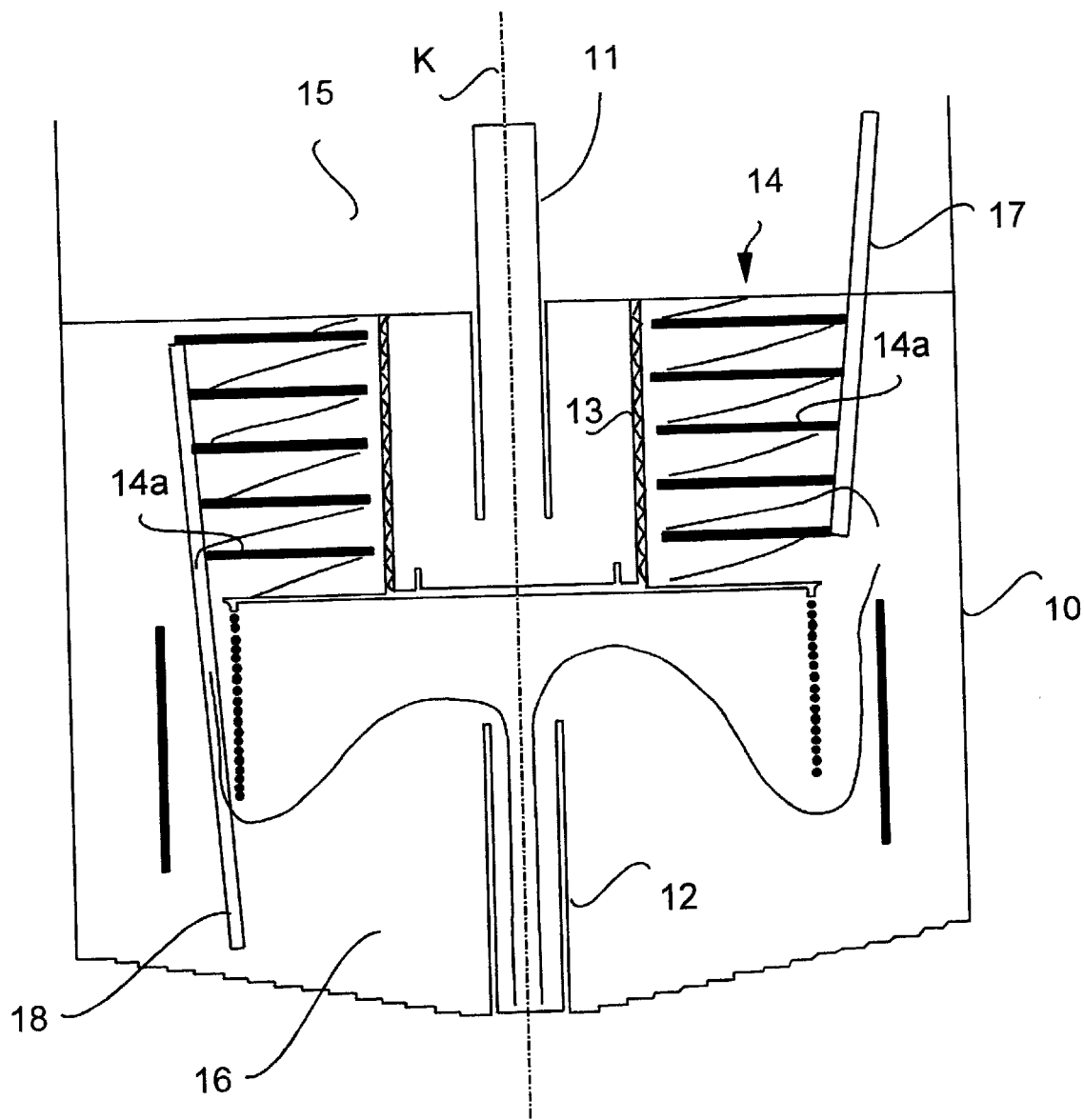
FIG. 2 is a general side view of a lubricating oil tank of the arrangement according to the invention.

FIG. 2 is a general section view of a lubricating oil tank 10 of the arrangement according to the invention. The lubricating oil tank 10 has a rotationally symmetric structure. In the example illustrated in FIG. 2 a return duct 11 for the lubricating oil, the duct forming an extension to the return pipe lines 5 of the circulation lubrication system, and a suction duct 12 of pressure pipe lines 3 are arranged at the centre axis K of the rotationally symmetric structure. The return duct 11 and the suction duct 12 can also be placed elsewhere, not only at the axis K. The return duct 11 leads below the surface of the oil contained in the tank 10, wherefrom the return flow is passed through a dividing element 13, so that the return flow can be distributed in an area as wide as possible. The dividing element 13 may comprise a cylindrical, conical or some other similar part made of a net, a grate structure or some other similar netlike structure.

The return flow of the oil is passed through the dividing element 13 to means 14 which separate impurities from the oil. The means 14 for separating impurities from the oil comprise preferably a structure of partition walls 14a positioned one upon another with a mutual spacing. By means of this structure impurities can be separated from the oil as efficiently as possible. The partition walls 14a are arranged to guide air bubbles drifting to the walls towards an air space 15 in the upper part of the tank 10 and water particles towards the lower part 16 of the tank 10. Horizontal partition walls positioned one upon another shorten the distance that the above-mentioned dirt particles travel in the oil flow.

The partition walls 14a are attached to air collecting ducts 17 by means of which the air separated from the flow is passed to the air space 15 of the tank, and to water collecting ducts 18, by means of which the water separated from the flow is passed to the lower part 16 of the tank 10. The above ducts may comprise pipes, groovelike structures, etc. When the flow field is even, oil will not remain stagnant in the corners of the tank in relation to the flow field, which is what happens in flow fields in conventional systems of the prior art. Thus in the tank of the arrangement according to the invention the capacity of the whole tank is efficiently involved in the flow.

The above-described embodiments are by no means intended to restrict the invention, but the invention can be modified quite freely within the scope of the claims. Accordingly, it is obvious that the arrangements according to the invention or its details need not necessarily be similar to those shown in the figures but other solutions are possible as well.

What is claimed is:

1. A circulation lubrication system comprising:
   a lubricating oil tank;
   pressure pipe lines configured to supply oil to part to be lubricated;
   return pipe lines configured to return the oil from the parts to be lubricated to the oil tank; and
   a mechanism configured to pump oil into the pressure pipe lines and maintain a desired state of lubrication, wherein the lubricating oil tank has rotationally symmetric structure, and a return duct positioned at the center axis of the rotationally symmetric structure and further configured to extend below the surface of the oil contained in the lubricating oil tank, wherein a return flow through the return duct passes through a dividing element to a mechanism configured to separate impurities from the oil, the mechanism configured to separate impurities from the oil including a structure of partition walls positioned one upon another and having a mutual spacing,
   wherein the partition walls are attached to air collecting ducts that lead to an air space located in an upper portion of the lubricating oil tank, and to water collecting ducts that extend to a bottom portion of the lubricating oil tank;
   wherein a suction duct of the pressure pipe lines is positioned at the center axis of the rotationally symmetric structure of said lubricating oil tank.

2. The circulation lubrication system of claim 1, wherein the dividing element is a cylindrical element.

3. The circulation lubrication system of one of claims 1 and 2, wherein the dividing element has a netlike structure.

4. The circulation lubrication system of claim 2, wherein the suction duct is configured to convey purified oil.

* * * * *